United States Patent
Appelo et al.

(10) Patent No.: US 8,894,744 B2
(45) Date of Patent: Nov. 25, 2014

(54) SYSTEM AND METHOD OF CLEANING PARTICULATE COLLECTION DEVICES USED IN A FLUE GAS PROCESSING SYSTEM

(71) Applicant: ALSTOM Technology Ltd, Baden (CH)

(72) Inventors: Per-Erik Albert Appelo, Knoxville, TN (US); Mikael Fredriksson, Ponferrada (ES)

(73) Assignee: ALSTOM Technology Ltd, Baden (CH)

( * ) Notice: Subject to any disclaimer, the term of this patent is extended or adjusted under 35 U.S.C. 154(b) by 60 days.

(21) Appl. No.: 13/795,962

(22) Filed: Mar. 12, 2013

(65) Prior Publication Data

US 2013/0255485 A1    Oct. 3, 2013

Related U.S. Application Data (60) Provisional application No. 61/617,377, filed on Mar. 29, 2012.

(51) Int. Cl.
*B01D 46/04* (2006.01)
*B01D 46/00* (2006.01)
*B01D 46/44* (2006.01)

(52) U.S. Cl.
CPC ........... *B01D 46/04* (2013.01); *B01D 46/0068* (2013.01); *B01D 46/446* (2013.01)
USPC ......... 95/20; 55/283; 55/302; 95/280; 96/421

(58) Field of Classification Search
USPC ......... 55/302, 283, DIG. 34; 95/20, 280, 283; 96/426, 427
See application file for complete search history.

(56) References Cited

U.S. PATENT DOCUMENTS

| | | |
|---|---|---|
| 3,266,225 A | 8/1966 | Barr |
| 3,390,512 A | 7/1968 | Hanes |

(Continued)

FOREIGN PATENT DOCUMENTS

| | | |
|---|---|---|
| CN | 200968897 Y | 10/2007 |
| CN | 101176834 A | 5/2008 |

(Continued)

OTHER PUBLICATIONS

International Search Report and The Written Opinion of the International Searching Authority, mailed Jul. 2, 2013 (PCT/IB2013/052403).

*Primary Examiner* — Duane Smith
*Assistant Examiner* — Minh-Chau Pham
(74) *Attorney, Agent, or Firm* — Rita D. Vacca (57) ABSTRACT

A system is provided for removing particulate matter from a particulate collection device utilized to collect particulate matter from a flue gas stream. The system includes a pressure vessel for storing a pressurized gaseous medium in an interior area defined by the pressure vessel. A first pressure sensor is in communication with the interior area and configured to measure pressure therein. A particulate collection device for collecting particulate matter from a flue gas stream includes a conduit in communication with the pressure vessel. A valve is disposed in the conduit and adapted to open to release a pulse of the pressurized gaseous medium from the pressure vessel into the particulate collection device. A control system is in communication with the valve and the first pressure sensor, and includes a controller configured to operate the valve based upon at least one pressure measurement received from the first pressure sensor.

20 Claims, 4 Drawing Sheets

(56) References Cited

U.S. PATENT DOCUMENTS

| | | | |
|---|---|---|---|
| 4,033,732 A | 7/1977 | Axelsson et al. | |
| 4,247,310 A | 1/1981 | Borst | |
| 4,293,320 A | 10/1981 | Robinson | |
| 4,433,986 A | 2/1984 | Borst | |
| 4,465,497 A | 8/1984 | Howeth | |
| 4,500,326 A | 2/1985 | Sunter | |
| 4,507,130 A | 3/1985 | Roth | |
| 4,655,799 A | 4/1987 | Bosworth et al. | |
| 5,094,675 A | 3/1992 | Pitt et al. | |
| 5,178,652 A * | 1/1993 | Huttlin | 95/279 |
| 5,387,406 A | 2/1995 | Ruoff | |
| 5,395,409 A | 3/1995 | Klimczak et al. | |
| 6,056,797 A | 5/2000 | Richard | |
| 6,171,366 B1 * | 1/2001 | Vicard et al. | 95/1 |
| 6,605,139 B2 | 8/2003 | Felix | |
| 6,749,665 B2 * | 6/2004 | Bjarnø et al. | 95/20 |
| 6,890,365 B2 | 5/2005 | Prill | |
| 7,396,514 B2 | 7/2008 | Hammel | |
| 8,029,607 B2 | 10/2011 | Ray | |
| 8,673,066 B2 * | 3/2014 | Koyama et al. | 95/280 |
| 2002/0014156 A1 * | 2/2002 | Leibold et al. | 95/280 |
| 2003/0089234 A1 * | 5/2003 | Bjarnø et al. | 95/280 |
| 2003/0113239 A1 | 6/2003 | Pahlman et al. | |
| 2003/0157008 A1 | 8/2003 | Pahlman et al. | |
| 2005/0238549 A1 | 10/2005 | Hammel | |
| 2009/0107337 A1 | 4/2009 | Vu | |
| 2010/0180556 A1 * | 7/2010 | Jensen | 55/293 |

FOREIGN PATENT DOCUMENTS

| | | |
|---|---|---|
| CN | 201353468 Y | 12/2009 |
| CN | 101642653 A | 2/2010 |
| CN | 201578960 U | 9/2010 |
| DE | 3336487 A1 | 4/1985 |
| EP | 2602016 A1 | 6/2013 |
| WO | 95/27431 | 10/1995 |
| WO | 02/09852 A2 | 2/2002 |
| WO | 2010/148437 A1 | 12/2010 |
| WO | 2012/016299 A1 | 2/2012 |

* cited by examiner

SYSTEM AND METHOD OF CLEANING PARTICULATE COLLECTION DEVICES USED IN A FLUE GAS PROCESSING SYSTEM

CROSS-REFERENCE TO RELATED APPLICATIONS

This patent application claims benefit under 35 U.S.C. §119(e) of U.S. Provisional Patent Application No. 61/617,377 entitled "SYSTEM AND METHOD OF CLEANING PARTICULATE COLLECTION DEVICES USED IN A FLUE GAS PROCESSING SYSTEM," filed Mar. 29, 2012, the disclosure of which is incorporated by reference herein in its entirety.

FIELD

The present disclosure is generally directed to particulate collection devices used in a flue gas processing system. More particularly, the present disclosure is directed to a system and a method for removing particulate matter from the particulate collection device with the use of pressurized fluid pulses having a controlled release based upon pressure in a pressurized fluid supply vessel.

BACKGROUND

Combustion of fossil fuels typically produces an exhaust gas stream (commonly referred to as a "flue gas stream") that contains contaminants, such as sulfur oxides (SOx), nitrogen oxides (NOx), mercury, and carbon containing species, as well as particulate matter such as dust or fly ash. To meet requirements established under certain laws and protocols, plants that burn fossil fuels subject the resultant flue gas stream to various processes and systems to reduce or eliminate the amount of contaminants present in the flue gas stream prior to releasing the flue gas stream to the atmosphere.

Many flue gas stream treatment systems employ at least one particulate collection device to remove particulate matter from the flue gas stream. One example of a particulate collection device is a fabric filter, through which the flue gas stream flows. The filters include media formed into filter cartridges or filter bags. The particulate-laden flue gas stream flows through the filters while the particulate contaminants are trapped thereon. The filtered flue gas stream is then subjected to another process for further contaminant removal, or is released to the atmosphere.

Over time, the filters collect a significant amount of particulate matter resulting in an accumulated build-up of particulate matter on the filter. The increasing build-up of particulate matter causes an increase in pressure drop across the filters, which in turn increases the energy consumed to generate an effective flow of flue gas through the filters. Accordingly, the filters need to be periodically cleaned to remove the build-up of particulate matter thereon.

A disadvantage of known methods and apparatus to periodically clean the filters is, in case of off-line cleaning, the amount of time it takes to shut down at least a portion of the plant in order to clean the filter(s). Another disadvantage of known cleaning methods and apparatus is the unsynchronized manner in which certain filters have to be cleaned. That is, in plants utilizing multiple filters or multiple filter compartments, the various filter elements may need to be cleaned in a specific order and at a specific time interval. Further disadvantages of known systems and processes include reduced filter life and higher than desired emissions of particulate matter in the released flue gas stream. What is therefore desired is a uniform method by which the filters can be cleaned in an efficient manner that does not disrupt the operation of the plant as a whole and results in longer filter life and lower emissions of particulate matter.

SUMMARY

According to aspects illustrated herein, there is provided a system for removing particulate matter from a particulate collection device utilized to collect particulate matter from a flue gas stream. The system includes a pressure vessel for storing a pressurized gaseous medium in an interior area defined by the pressure vessel. A first pressure sensor is in communication with the interior area and configured to measure pressure therein. A particulate collection device for collecting particulate matter from a flue gas stream includes a conduit in communication with the pressure vessel. A valve is disposed in the conduit and adapted to open to release a pulse of the pressurized gaseous medium from the pressure vessel into the particulate collection device. A control system is in communication with the valve and the first pressure sensor, and includes a controller configured to operate the valve based upon at least one pressure measurement received from the first pressure sensor.

According to further aspects illustrated herein, there is provided a method for removing particulate matter from a particulate collection device utilized to collect particulate matter from a flue gas stream. The method comprises: providing a pressure vessel for storing a pressurized gaseous medium in an interior area defined by the pressure vessel; providing a particulate collection device for collecting particulate matter from the flue gas stream; providing a conduit in communication with the interior area of the pressure vessel, the conduit having a valve in communication with the particulate collection device; operating the valve and supplying a first pulse of the pressurized gaseous medium to the particulate collection device initiating when the pressurized gaseous medium in the pressure vessel is at a first pressure and terminating when the pressurized gaseous medium in the pressure vessel is at a second pressure.

The above described and other features are exemplified by the following figures and in the detailed description.

BRIEF DESCRIPTION OF THE DRAWINGS

Referring now to the figures which are exemplary embodiments and wherein like elements are numbered alike.

DETAILED DESCRIPTION

As further described below with reference to FIGS. 1 and 2, a particulate collection device 102 comprising a plurality of filter elements 106 arranged to extract particulate matter 114 out of a flue gas stream 112 is cleaned by pressurized air pulses or cleaning pulses. The frequency, maximum pressure and duration of the pressurized air pulses are measured and subsequently selected for cleaning a first plurality of filter elements 106 in order to minimize the total emission of dust and particulates therefrom. After each pressurized air pulse, a maximum value for an instantaneous emission of dust, referred to as an "emission peak," is determined. The emission peak is used for selecting the frequency, maximum pressure, and/or the duration of the pressurized air pulses for cleaning a second plurality of filter elements 106 in a sequence during a continued cleaning operation. Such a method for cleaning a similar particulate collection device 102, namely a barrier filter, is shown and described in U.S. Pat. No. 6,749,665 issued to Bjarno et al. and assigned to Alstom Power N.V., the disclosure of which is incorporated herein by reference in its entirety.

Figure 1:
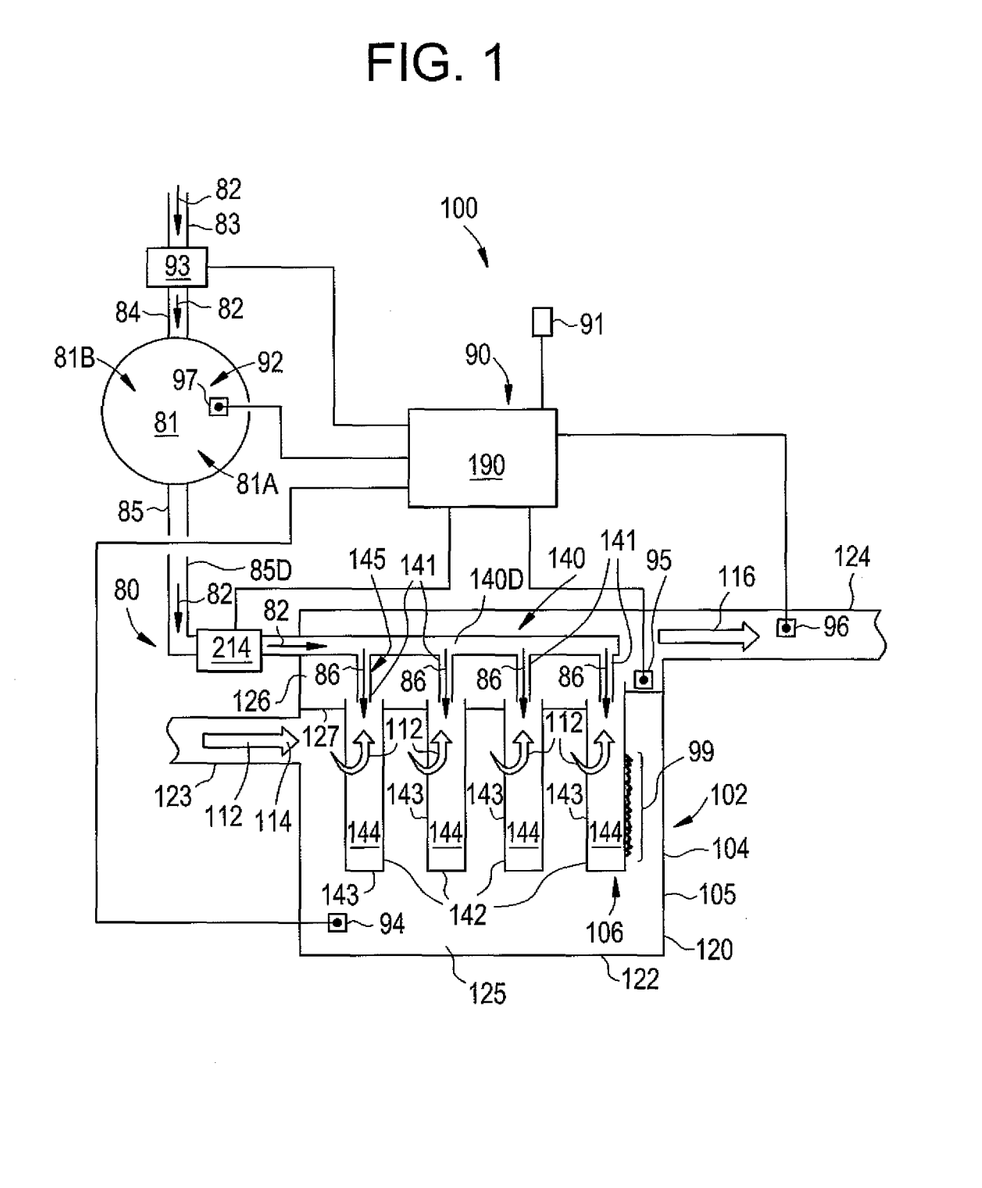
FIG. 1 discloses a schematic side-view of a tubular filter with a device for pressurized air pulse cleaning and control equipment adapted for carrying out the method according to the invention.
Figure 2:
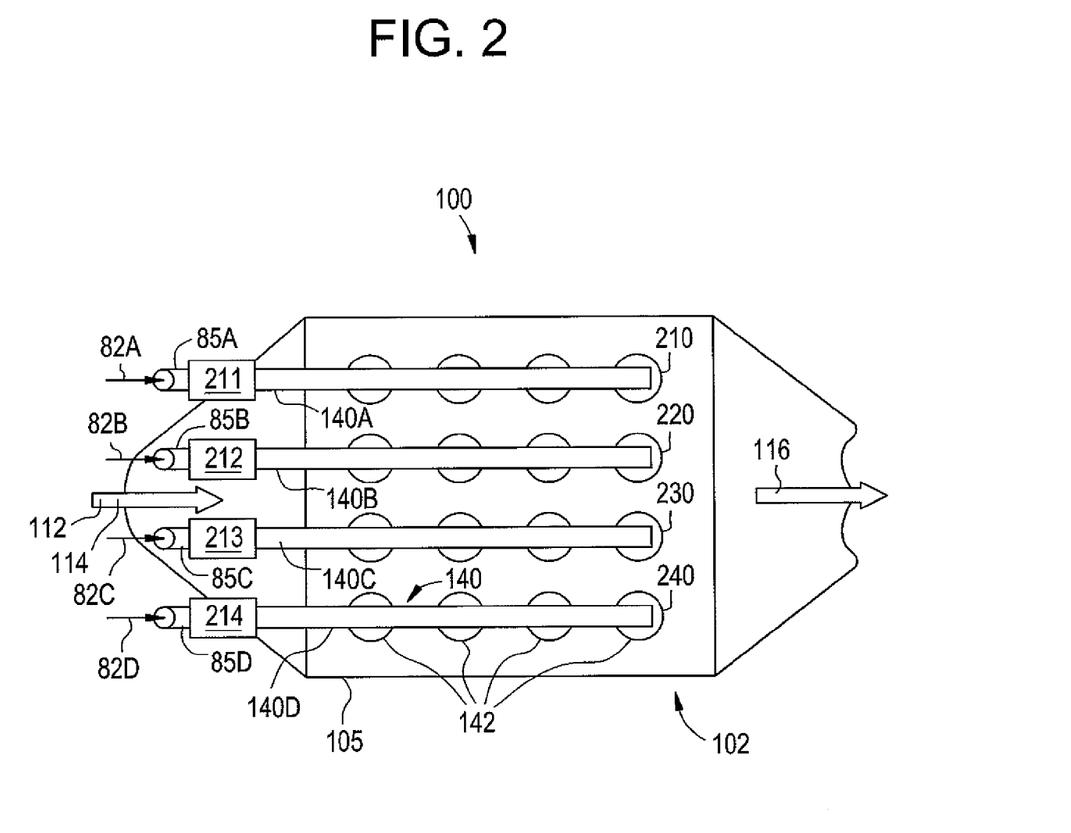
FIG. 2 discloses schematically a view from above of the tubular filter of FIG. 1 without the control equipment.

FIG. 1 and FIG. 2 illustrate a system 100 for removing particulate matter from the particulate collection device 102. In one embodiment the particulate collection device 102 is a filter and such filter preferably is fabricated from woven fabric or felt. In another embodiment, the particulate collection device 102 comprises a barrier filter 104 having one or a plurality of filter elements 106 in the form of one or a plurality of filter tubes 142. In one embodiment, the filter elements 106 are fabricated from woven fabric or felt. In one embodiment, the filter tubes 142 similarly are fabricated from woven fabric or felt. In one embodiment, the filter tubes 142 comprise a filter medium 143 defining an interior area 144 bounded by the filter medium 143. The particulate collection device 102 may be positioned inside a baghouse (not shown) together with one or more other particulate collection devices. The particulate collection device 102 is positioned in the flow of the flue gas stream 112, which contains, among other things, particulate matter 114 that is generated by for example the combustion of a fossil fuel or from other processes (not shown). Particulate matter 114 may include, for example, fly ash, dust and the like.

As the flue gas stream 112 flows through the particulate collection device 102, the particulate matter 114 in the flue gas stream 112 collects on the particulate collection device 102, thereby removing the particulate 114 from the flue gas stream 112. A filtered flue gas stream 116 is released to the atmosphere via a stack (not shown) or subjected to further processing (not shown) to remove other contaminants such as SOx and/or NOx, and the like. Over time, the particulate matter 114 collected on the particulate collection device 102 builds up and decreases the efficiency of the flue gas cleaning process of system 100.

As further shown in FIGS. 1 and 2, the particulate collection device 102 comprises a tubular filter 105 having a housing 122, an inlet 123 through which the flue gas stream 112 passes, and an outlet 124 through which the filtered flue gas stream 116 passes. The tubular filter 105 is divided into a first section or a raw gas chamber 125 for receiving the incoming flue gas stream 112 from the inlet 123; and a pure gas chamber 126 positioned proximate to an intermediate wall 127. The pure gas chamber 126 collects the filtered flue gas stream 116 and passes it to the outlet 124. The intermediate wall 127 supports the plurality of filter tubes 142. In one embodiment as shown in FIG. 2, the plurality of filter tubes 142 are configured in four rows 210, 220, 230, and 240, and each row 210, 220, 230, 240 includes four filter tubes 142. As shown in FIG. 1, the flue gas stream 112 flows into and through the raw gas chamber 125, and through the filter medium 143 into the interior area 144 of the filter tubes 142. Particulate matter 114 in the flue gas stream 112 collects on the filter medium 143 of the filter tubes 142. The filtered flue gas stream 116, having a reduced particulate matter content, collects in the pure gas chamber 126 and passes from the housing 122 of the tubular filter 105 through the outlet 124.

As further shown in FIG. 1, a subsystem 80 is in fluid communication with the tubular filter 120 to provide for cleaning the filter tubes 142 by means of pressurized air pulses. At least one distributing pipe 140 extends into the pure gas chamber 126. The distributing pipe 140 defines at least one discharge port 145 extending at least partially into the pure gas chamber 126. In one embodiment, each of the discharge ports 145 comprises a nozzle 141 located substantially centrally above each filter tube 142. For example, the nozzle 141 is positioned at a discharge portion of the filter tube 142 proximate to the distributing pipe 140. While the nozzle 141 is shown and described as being located substantially centrally above each filter tube 142 and positioned at a discharge portion of the filter tube 142 proximate to the distributing pipe 140, the present invention is not limited in this regard as the nozzle 141 may be located substantially centrally at any position within the interior area 144 defined by the filter medium 143 of the filter tubes 142 without departing from the broader aspects of the invention. As shown in FIG. 2, each row 210, 220, 230, 240 of the filter tubes 142 is in fluid communication with at least one distributing pipe 140 having a nozzle 141 located substantially centrally above each filter tube 142. Each row 210, 220, 230, 240 further includes a respective valve member or valve 211, 212, 213 and 214 in fluid communication with, and controlling the flow through, a respective distributing pipe 140A, 140B, 140C and 140D.

A pressure vessel such as a pressurized air tank 81 is in fluid communication with an overpressure source, for instance a compressor (not shown), via a first conduit 83. The pressurized air tank 81 stores a pressurized gaseous medium 81A in an interior area 81B defined by the tank 81. A stream of the pressurized gaseous medium 81A such as an air stream 82 is passed to the air tank 81 via a second conduit 84 as selectively determined by a control member 93. The air stream 82 is passed into the tubular filter 120 via a third conduit 85. In one embodiment, portions 82A, 82B, 82C and 82D of the air stream 82 are passed respectively to the valves 211, 212, 213, 214 via a respective fourth conduit 85A, 85B, 85C and 85D. Each valve 211, 212, 213, 214 selectively passes the respective portion 82A, 82B, 82C, 82D of the air stream 82 to its respective distributing pipe 140A, 140B, 140C, 140D. The nozzle 141 located substantially centrally above each filter tube 142 ejects a pressurized pulse such as a pressurized air pulse 86 into a respective filter tube 142 as determined by the system 100 as further described below. The pressurized air pulse 86 is released from the nozzle 141 in short, high powered pulses for contact with the filter tubes 142 in order to dislodge at least a portion of the particulate matter 114 from the filter tubes 142. While the pressurized pulse is shown and described as a pressurized air pulse 86, the present invention is not limited in this regard as the pressurized pulse may comprise, for example, a pressurized pulse of a suitable alternative gas or other medium, without departing from the broader aspects of the invention.

As described above, the frequency, maximum pressure and duration of the pressurized air pulses are measured and subsequently selected for cleaning a particular plurality of filter elements 106 in order to minimize the total emission of dust and particulates therefrom. Such operating parameters are measured or obtained via one or more measurement devices 92 including, but not limited to, pressure sensors, particulate mass concentration samplers, and flow meters. In one embodiment, the measurement devices 92 comprise transducers 94 for measuring the pressure in the raw gas chamber 125, one or more transducers 95 for measuring the pressure in the pure gas chamber 126, one or more transducers 96 for measuring the dust concentration in the outlet 124, and one or more transducers 97 for measuring the pressure in the tank 81. Optionally, one or more additional transducers (not shown) may be employed for measuring the gas volume flow through the tubular filter 105. While the measurement devices 92 are shown and described as comprising one or more transducers 94, 95, 96, 97, the present invention is not limited in this regard as the measurement devices 92 may comprise, for example, pressure gauges, electronic pressure sensors, pressure transmitters, pressure senders, pressure indicators and the like, without departing from the broader aspects of the invention.

The control member 93, transducers 94, 95, 96, 97, and the valves 211, 212, 213, 214 are in electrical communication with a control system or control apparatus 90, and can transmit and receive electrical signals therebetween. The control apparatus 90 comprises a device capable of receiving and transmitting information and/or commands from a user or another device, storing information, and responding to information and/or commands entered by a user or another device. The control apparatus 90, control member 93, transducers 94, 95, 96, 97, and valves 211, 212, 213, 214, are electronically coupled to one another through wires or other physical conduits or via a wireless manner.

In one embodiment, the control apparatus 90 comprises a Programmable Logic Controller ("PLC") 190, referred to herein as the controller 190, for selecting the frequency, maximum pressure and duration of the pressurized air pulses for cleaning a plurality of filter elements 106, based on one or more signals received respectively from the transducers 94, 95, 96, 97, and transmitting signals respectively to the valves 211, 212, 213, 214 for operation thereof. The controller 190 is configured to receive and transmit multiple signals simultaneously, at elevated temperature ranges, and having a resistance to vibration, impact and electrical noise. While the control apparatus 90 is shown and described as comprising a controller 190, the present invention is not limited in this regard as the control apparatus 90 may comprise, for example, a supervisory control and data acquisition ("SCADA") system, a distributed control systems ("DCS"), a computer or any type of microprocessor or like programmable control device having software installed therein, a server connected to one or more programmable devices, or any like controller without departing from the broader aspects of the invention. As used herein, the term "computer" encompasses desktops, laptops, tablets, handheld mobile devices, mobile phones, internet ready televisions, and the like. In one embodiment, the control apparatus 90 includes an alarm 91 coupled to the control apparatus 90. The alarm 91 may be any type of audio, visual, or audio and visual alarm. Alternatively, the alarm 91 may send a signal to a user device such as a computer. The alarm 91 may be triggered, for example, if a measured pressure is higher than a desired or design pressure.

In operation of the system 100, the dust-containing flue gas stream 112 passes into the tubular filter 105 through the inlet 123 to the raw gas chamber 125, through the filter tubes 142, into the pure gas chamber 126, and out of the tubular filter 105 through the outlet 124 and is released to the atmosphere via a stack (not shown) or is passed to one or more units of an Air Quality Control System ("AQCS") (not shown) for control and/or removal of additional particulates from the flue gas. The pressure in the raw gas chamber 125 and in the pure gas chamber 126 is measured, substantially continuously, by the transducers 95 and 96. During operation, extracted particulates and/or dust forms a dust heap 99 along the outer sides of the filter tubes 142 and subsequently is separated therefrom. As the thickness of the dust heap 99 increases, the pressure drop between the raw gas chamber 125 and the pure gas chamber 126 correspondingly increases.

When the pressure difference, also referred to as the pressure drop, between the raw gas chamber 125 and the pure gas chamber 126 reaches a first predetermined limit value, for example in the range of about 1400 Pascal ("Pa"), a row 210, 220, 230, 240 of the filter tubes 142 is subjected to a cleaning operation. The subsequent pressure of the raw gas chamber 125 and the pure gas chamber 126 is measured by the transducers 95 and 96, transmitted to the control apparatus 90, and the pressure difference between the raw gas chamber 125 and the pure gas chamber 126 is determined. If the pressure difference after the cleaning operation has fallen less than for example 50 Pa, another row 210, 220, 230, 240 of the filter tubes 142 is subjected to a cleaning operation. The described measurement of the resultant difference of pressure between the raw gas chamber 125 and the pure gas chamber 12, after a row 210, 220, 230, 240 of the filter tubes 142 is subjected to a cleaning operation, is repeated until a desired pressure difference value is achieved. When such a pressure difference value is achieved, the cleaning operation is suspended until the pressure drop over the filter tubes 142 and the dust heap 99, i.e. the pressure difference between the raw gas chamber 125 and the pure gas chamber 126, again reaches 1400 Pa. At this occurrence, a row 210, 220, 230, 240 of the filter tubes 142 that was not subjected to a cleaning operation at the previous cleaning occurrence, is now subjected to a cleaning operation in the same manner and in accordance with the operating parameters as described above.

During operation, a first pressure of the tank 81 is obtained before the controller 190 initiates a cleaning occurrence or a cleaning sequence based upon the pressure difference between the raw gas chamber 125 and the pure gas chamber 126 as described above. A second pressure of the tank 81 is obtained upon termination of the cleaning sequence by the controller 190, again based upon the resultant pressure difference between the raw gas chamber 125 and the pure gas chamber 126. During the cleaning sequence, at least one valve 211, 212, 213, 214 is selectively opened by the controller 190 for a predetermined duration or time. Operating parameters for each valve 211, 212, 213, 214 are selectively determined by the controller 190 and are based upon a comparison of, a ratio of, or a difference between or any mathematical model incorporating, the first and second pressure of the tank 81. For example, the controller 190 operates the valve 211, 212, 213, 214 to achieve the second pressure, a certain desirable resultant or second pressure, in the tank 81 as measured by transducers 97. The pressure in the tank 81 is measured when the at least one valve 211, 212, 213, 214 has closed and such measured pressure is compared to the desirable pressure in the tank 81 and a setpoint is calculated for the selected valve. The next time the selected valve 211, 212, 213, 214 is operated, the opening time is adjusted for that particular valve 211, 212, 213, 214. For example, if the second pressure in the tank 81 was too low after the previous cleaning sequence, then the opening time of the particular valve 211, 212, 213, 214 will be reduced the next time it is selected to be operated by the controller 190. Correspondingly, if the end pressure in the tank 81 was too high after the previous cleaning sequence, then the opening time of the particular valve 211, 212, 213, 214 will be increased the next time it is selected to be operated by the controller 190.

Accordingly, the second pressure in the tank 81 is measured after each cleaning sequence that engages a particular valve 211, 212, 213, or 214, and such second pressure measurements are used for selecting the frequency and/or the duration of the next cleaning sequence that again engages the particular valve 211, 212, 213, or 214. In one embodiment, a variation in the second pressure in the tank 81 at a particular duration of a cleaning sequence for a particular valve 211, 212, 213, or 214 is monitored, and the alarm 91 coupled to the control apparatus 90 is triggered when the variation in such second pressure in the tank 81 exceeds a predetermined value. In another embodiment, a variation in the second pressure in the tank 81 at a particular duration of a cleaning sequence for a particular valve 211, 212, 213, or 214 is monitored, and a maximum duration of the cleaning sequence is set when the variation in such second pressure in the tank 81 exceeds a predetermined value.

In one embodiment, a required cleaning sequence duration to achieve a predetermined second pressure in the tank 81 for a particular valve 211, 212, 213, or 214 is monitored, and the alarm 91 coupled to the control apparatus 90 is triggered when the cleaning sequence duration to achieve such second pressure in the tank 81 is lower than a predetermined value. In one embodiment, a required cleaning sequence duration to achieve a predetermined second pressure in the tank 81 for a particular valve 211, 212, 213, or 214 is monitored, and a maximum duration of the cleaning sequence is set when the cleaning sequence duration to achieve such second pressure in the tank 81 is lower than a predetermined value.

In one embodiment, the pressure difference (or pressure drop) between the raw gas chamber 125 and the pure gas chamber 126 is measured substantially continuously and each row 210, 220, 230, 240 of the filter tubes 142 is cleaned in a predetermined order such that the cleaning of a particular row 210, 220, 230, 240 of the filter tubes 142 occurs when the pressure difference (or pressure drop) reaches a first determined limit value. In addition, when the first pressure in the tank 81 is lower than a predetermined value, the second pressure in the tank 81 is increased to achieve a predetermined first pressure in the tank 81 at the next cleaning sequence.

At least one of the valves 211, 212, 213, 214 is selected to be operated by the controller 190 for each cleaning sequence initiated by the controller 190. The operating parameters for selection and sequential operation (i.e., opening and closing) of the valves 211, 212, 213, 214 during each cleaning sequence is based upon data received and transmitted between the controller 190, the transducer 97 (i.e., the first and second pressure measurements in the tank 81), and the selected valve(s) 211, 212, 213, 214. The initiation of each cleaning cycle by the controller 190 is based upon data received and transmitted between the controller 190 and the transducers 95 and 96 (i.e., the pressure difference between the raw gas chamber 125 and the pure gas chamber 126).

As shown in FIG. 1, the nozzle 141 is positioned above the filter tube 142 such that when the pressurized air pulse 86 is ejected from the nozzle 141, it is directed into contact with the filter tube 142 to dislodge particulate matter 114 collected on the filter tube 142. Optionally, the nozzle 141 may be positioned inside the filter tube 142. By placing the nozzle 141 inside the filter tube 142, the pressurized air pulse 86 is ejected from the nozzle 141 and expands the filter tube 142 at high speed so that the particulate matter 114 collected on the outside of the filter tube 142 is dislodged when the filter tube 142 stops at its maximum, most expanded, dimensions.

The above-described cleaning operation having cleaning sequences further serves to identify malfunctioning valves 211, 212, 213, 214 that require an exceptionally long time to close. Such valves 211, 212, 213, 214 are identified by the control apparatus 90. Depending on a desired mode of operation of the system 100, the malfunctioning valve 211, 212, 213, 214 is operated with a higher second pressure in the tank 81 or is removed from service and/or flagged as defective. The opening time of each valve 211, 212, 213, 214 is continuously measured and monitored. If the opening time is shorter than a first predetermined value, and at the same time the achieved second pressure in the tank 81 after a cleaning sequence is lower than a second predetermined value, the valve 211, 212, 213, 214 will be identified by the control apparatus 90 as malfunctioning.

The above-described cleaning operation having cleaning sequences also serves to identify malfunctioning valves 211, 212, 213, 214 that exhibit a large variation in second pressure in the tank 81 after a cleaning sequence. Again, such valves 211, 212, 213, 214 are identified by the control apparatus 90. Depending on a desired mode of operation of the system 100, the malfunctioning valve 211, 212, 213, 214 is operated with a higher second pressure in the tank 81 or is removed from service and/or flagged as defective. The opening time of each valve 211, 212, 213, 214 is continuously measured and monitored. If the range of the opening time is larger than a third predetermined value, or if other suitable measured or calculated statistics, or other operating parameters that signify a variation in the opening time exceeds a fourth predetermined value, the valve 211, 212, 213, 214 will be identified by the control apparatus 90 as malfunctioning. In one embodiment, a variation in the second pressure in the tank 81 at a particular duration of a cleaning sequence for a particular valve 211, 212, 213, or 214 is monitored, and the particular valve 211, 212, 213, or 214 is taken out of service when the variation in such second pressure in the tank 81 exceeds a predetermined value. In one embodiment, a required cleaning sequence duration to achieve a predetermined second pressure in the tank 81 for a particular valve 211, 212, 213, or 214 is monitored, and the particular valve 211, 212, 213, or 214 is taken out of service when the pulse duration to achieve such second pressure in the tank 81 is lower than a predetermined value.

The above-described cleaning operation having cleaning sequences provides a flue gas stream cleaning process that can be strategically and specifically targeted to those particulate collection devices 102 in need of cleaning. Such a system and process results in fewer plant shutdowns for cleaning. Additionally, such a system and process extends the life of the particulate collection devices 102 since each particulate collection device 102 is cleaned only when necessary.

Figure 3:
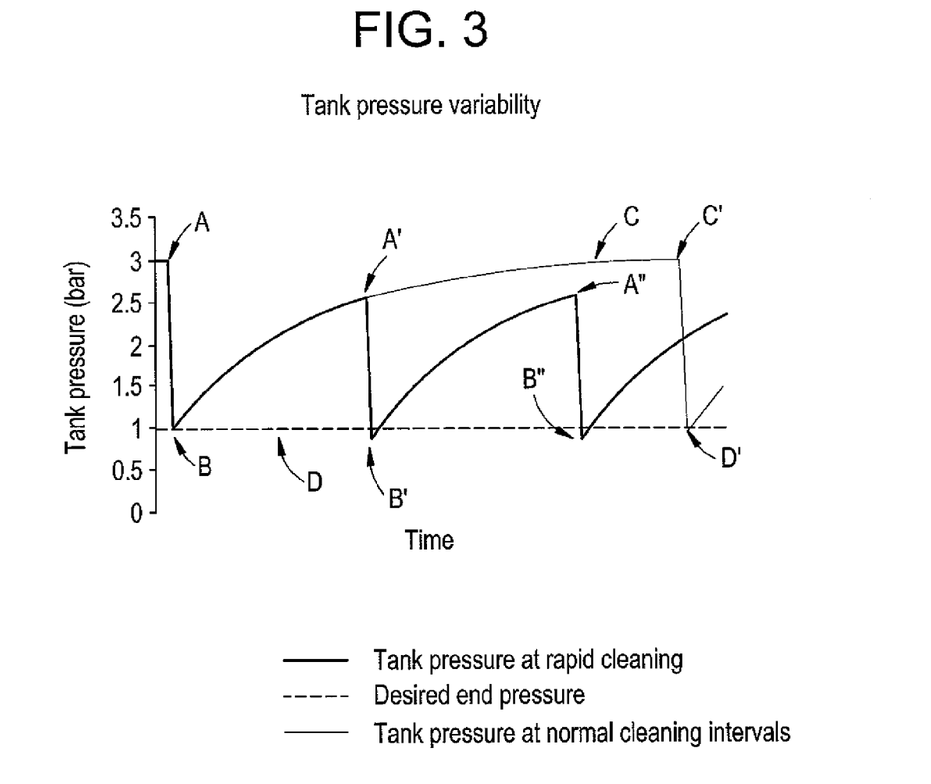
FIG. 3 discloses a graph illustrating the varying pressure of a pressurized air tank caused by variation of the initial pressure in the tank and the opening and closing of a valve during rapid cleaning sequences.

FIG. 3 provides a graph of the pressure variability of the pressurized air tank 81 as a function of time. As shown in FIG. 3, the pressure in the tank 81 fluctuates with the opening and closing of a valve 211, 212, 213, 214. In particular, during rapid cleaning sequences, the pressure in the tank 81 may fall below the desired second pressure value. During operation, a first pressure in the tank 81, for example 3.0 bar designated as Point A, is measured and a cleaning sequence is initiated by the controller 190 as described above. At least one valve 211, 212, 213, 214 is selectively opened for a particular duration based upon the difference between the first pressure in the tank 81, Point A, and the desired second pressure or second pressure in the tank 81 after the cleaning sequence, for example 1.0 bar designated as Point B.

During sequential cleaning occurrences, or rapid cleaning sequences as shown in FIG. 3, the operating parameters for valve 211, 212, 213, 214 are based on past performance of the selected valve as recorded by the controller 190. For example, a subsequent cleaning sequence is initiated by the control apparatus 190 as described above. Upon initiation of the cleaning sequence, the first pressure in the tank 81 is 2.5 bar designated as Point A'. Preferably at least one other valve 211, 212, 213, 214 is selectively opened for a particular duration and, in this cleaning sequence, the operating parameters of the selected valve 211, 212, 213, 214 caused such valve to be opened for a particular duration such that a second pressure B' in the tank 81 is approximately 0.8 bar or less than the desired second pressure Point B by about 20%. Thereafter, a subsequent cleaning sequence is initiated by the control apparatus 190 as described above at a time at which the first pressure in the tank 81 is again 2.5 bar designated as Point A". Again, preferably at least one other valve 211, 212, 213, 214 is selectively opened for a particular duration and, in this cleaning sequence, the operating parameters of the selected valve 211, 212, 213, 214 caused such valve to be opened for a particular duration such that a second pressure B" in the tank 81 again is approximately 0.8 bar or less than the desired second pressure Point B by about 20%.

During rapid cleaning sequences, the pressure of the tank 81 does not fully recover, for example to Point A, because of the opening of a selected valve 211, 212, 213, 214 before pressure in the tank 81 has reached Point A. Under normal operating cleaning sequences (i.e., not rapid cleaning sequences), a desired first pressure of the tank 81, represented by the line designated as line C, can be achieved such that the tank 81 exhibits a substantially constant first pressure, for example 3.0 bar at Point A and C'. Under such conditions, the desired second pressure of the tank 81, represented by the line designated as line D, can be achieved such that the tank 81 exhibits a substantially constant second pressure, for example 1.0 bar at Point B and D'. In one embodiment, the operating parameters of a selected valve 211, 212, 213, 214 are set by the controller 190 such that the difference between the first pressure, for example Point A', and the second pressure, for example Point B', exceeds a set value, such as for example 1.0 bar, 1.5 bar, 2.0 bar, or some other set value.

Figure 4:
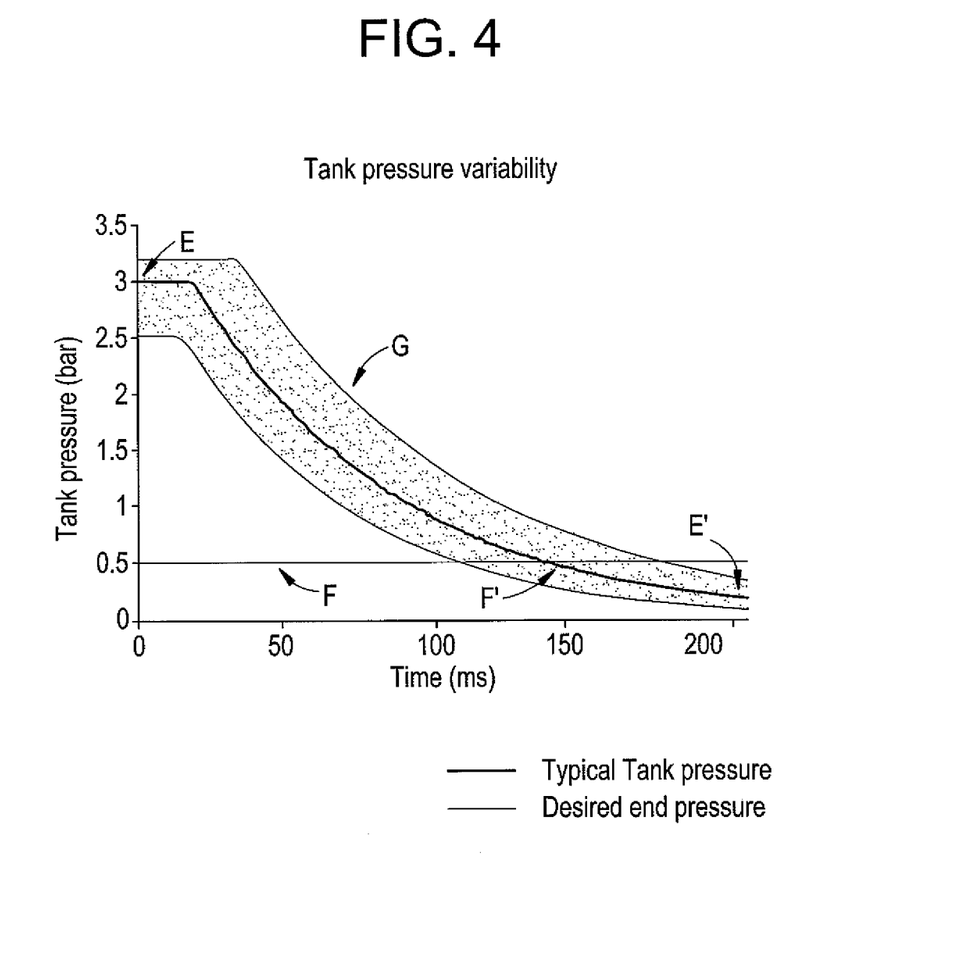
FIG. 4 discloses a graph illustrating the pressure of a pressurized air tank caused by variation of the initial pressure in the tank and the opening and closing of a valve during rapid cleaning sequences.

FIG. 4 also provides a graph of the pressure variability of the pressurized air tank 81 as a function of time. As shown in FIG. 4, the pressure in the tank 81 fluctuates with the opening of a valve 211, 212, 213, 214. During operation, a first pressure in the tank 81, for example 3.0 bar designated as Point E, is measured and a cleaning sequence is initiated by the controller 190 as described above. At least one valve 211, 212, 213, 214 is selectively opened for a particular duration based upon the difference between the first pressure in the tank 81, Point A, and the desired second pressure or second pressure in the tank 81 after the cleaning sequence, for example 1.0 bar designated as Point B. At least one valve 211, 212, 213, 214 is selectively opened for a particular duration based upon the difference between the first pressure in the tank 81, Point E, and the desired second pressure or second pressure in the tank 81 after the cleaning sequence, for example 0.5 bar designated as Point F' located on line F. As further shown in FIG. 4, an operating range for each valve 211, 212, 213, 214, represented by a shaded area G, can designated by the controller 190. As described above, if the pressure in the tank 81 continues to decrease after the controller 190 transmits a signal to the valve 211, 212, 213, 214 to close, for example to a second pressure of less than 0.25 bar designated as Point E', the continuing decreasing pressure, or less-than-timely increasing pressure, is likely indicative of a faulty valve.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or matter to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for removing particulate matter from a particulate collection device utilized to collect particulate matter from a flue gas stream, the system comprising:
   a pressure vessel for storing a pressurized gaseous medium in an interior area defined by the pressure vessel;
   a first pressure sensor in communication with the interior area and configured to measure pressure therein;
   a particulate collection device for collecting particulate matter from a flue gas stream, the particulate collection device including a conduit in communication with the pressure vessel;
   a valve disposed in the conduit and adapted to open to release a pulse of the pressurized gaseous medium from the pressure vessel into the particulate collection device;
   a control system in communication with the valve and the first pressure sensor, the control system including a controller configured to operate the valve to supply the pulse of the pressurized gaseous medium to the particulate collection device initiating when the pressurized gaseous medium in the pressure vessel is at a first pressure and terminating when the pressurized gaseous medium in the pressure vessel is at a second pressure, based upon at least one pressure measurement received from the first pressure sensor.

2. The system for removing particulate matter of claim 1, the controller further configured to:
   operate the valve during a plurality of cleaning sequences;
   receive from the first pressure sensor a first pressure measurement of the pressure vessel recorded before the valve is opened upon initiating at least one of the plurality of cleaning sequences;
   receive from the first pressure sensor a second pressure measurement of the pressure vessel immediately after the valve is closed upon terminating the at least one of the plurality of cleaning sequences; and
   transmit a signal to the valve causing the valve to operate during another of the plurality of cleaning sequences based on the first and second pressure measurements.

3. The system for removing particulate matter of claim 1, the particulate collection device further comprising:
   a barrier filter having at least one filter element;
   a first section for receiving the flue gas stream, the first section having a second pressure sensor configured to measure a third pressure therein;
   a second section for collecting a filtered flue gas stream from the at least one filter element, the second section having a third pressure sensor configured to measure a fourth pressure therein;
   the control system is in communication with second and third pressure sensors; and
   the controller is further configured to
      receive from the second pressure sensor the third pressure measurement;
      receive from the third pressure sensor the fourth pressure measurement;
      operate the valve based upon at least one pressure measurement received from each of the first, second and third pressure sensors.

4. The system for removing particulate matter of claim 3, the controller further configured to:
   operate the valve during a plurality of cleaning sequences;

receive from the first pressure sensor a first pressure measurement of the pressure vessel recorded before the valve is opened upon initiating at least one of the plurality of cleaning sequences;

receive from the first pressure sensor a second pressure measurement of the pressure vessel immediately after the valve is closed upon terminating the at least one of the plurality of cleaning sequences; and transmit a signal to the valve causing the valve to operate during another of the plurality of cleaning sequences based upon at least one pressure measurement received from each of the first, second and third pressure sensors.

5. The system for removing particulate matter of claim 3, the particulate collection device further comprising:

an inlet through which the flue gas stream passes into the first section of the particulate collection device; and an outlet through which the filtered flue gas stream passes from the second section of the particulate collection device.

6. The system for removing particulate matter of claim 5, the outlet having a particulate mass concentration sensor configured to measure a concentration of particulate matter in the filtered flue gas stream passing therethrough.

7. The system for removing particulate matter of claim 6, the controller further configured to receive from the particulate mass concentration sensor the concentration of particulate matter measurement.

8. The system for removing particulate matter of claim 1, the particulate collection device comprising a plurality of filter tubes.

9. The system for removing particulate matter of claim 8, the plurality of filter tubes comprising a woven fabric.

10. The system for removing particulate matter of claim 1, the particulate collection device further comprising:

a plurality of conduits in communication with the pressure vessel;

a valve disposed in each of the plurality of conduits and adapted to open to release a pulse of the pressurized gaseous medium from the pressure vessel into the particulate collection device; and the controller is configured to sequentially operate each of the valves based upon at least one pressure measurement received from the first pressure sensor.

11. The system for removing particulate matter of claim 1, the conduit comprising at least one discharge port extending at least partially into the particulate collection device and through which the pulse of the pressurized gaseous medium is released.

12. The system for removing particulate matter of claim 11, the at least one discharge port comprising a nozzle.

13. The system for removing particulate matter of claim 1, the particulate collection device further comprising:

a plurality of filter elements;

a plurality of conduits in communication with the pressure vessel and the plurality of filter elements;

a valve disposed in each of the plurality of conduits and adapted to open to release a pulse of the pressurized gaseous medium from the pressure vessel into the plurality of filter elements; and the controller is configured to sequentially operate each valve based upon at least one pressure measurement received from the first pressure sensor.

14. The system for removing particulate matter of claim 1, the controller comprising a programmable logic controller.

15. The system for removing particulate matter of claim 1, the particulate collection device further comprising a plurality of filter elements configured in four rows, each row having four filter elements therein.

16. A method for removing particulate matter from a particulate collection device utilized to collect particulate matter from a flue gas stream, the method comprising:

providing a pressure vessel for storing a pressurized gaseous medium in an interior area defined by the pressure vessel;

providing a first pressure sensor in communication with the interior area and configured to measure pressure therein;

providing a particulate collection device for collecting particulate matter from the flue gas stream;

providing a conduit in communication with the interior area of the pressure vessel, the conduit having a valve in communication with the particulate collection device;

operating the valve and supplying a first pulse of the pressurized gaseous medium to the particulate collection device initiating when the pressurized gaseous medium in the pressure vessel is at a first pressure and terminating when the pressurized gaseous medium in the pressure vessel is at a second pressure by using a control system in communication with the valve and the first pressure sensor that includes a controller configured to operate the valve to supply the pulse of the pressurized gaseous medium to the particulate collection device based upon at least one pressure measurement received from the first pressure sensor.

17. The method for removing particulate matter of claim 16 further comprising:

generating a pressure signal in the pressure sensor indicative of the first and second pressures and transmitting the signals to the controller;

defining a setpoint in the controller for subsequent operation of the valve after the first pulse of pressurized gas is supplied based upon the signals received from the pressure sensor; and operating the valve and supplying a second pulse of the pressurized gaseous medium to the particulate collection device based on the setpoint defined by the controller.

18. The method for removing particulate matter of claim 17 further comprising:

providing a plurality of filter elements in the particulate collection device, the conduit having a valve in communication with each of the plurality of filter elements;

operating at least one valve and supplying the first pulse of the pressurized gaseous medium to at least one of the plurality of filter elements; and operating at least another valve and supplying the second pulse of the pressurized gaseous medium sequentially to another of the plurality of filter elements.

19. The method for removing particulate matter of claim 17 further comprising:

determining a frequency in the controller for causing at least one of the first pulse and the second pulse.

20. The method for removing particulate matter of claim 17 further comprising:

determining a duration in the controller of at least one of the first pulse and the second pulse.

* * * * *